(12) United States Patent
Bolaños et al.

(10) Patent No.: US 10,592,197 B2
(45) Date of Patent: Mar. 17, 2020

(54) GESTURE-BASED ALIGNMENT METHODOLOGY TO EXTEND THE VIEWPORT ON ADJACENT TOUCH SCREEN DEVICES

(71) Applicant: Adobe Inc., San Jose, CA (US)

(72) Inventors: Oscar Bolaños, St-Sulpice (CH); Alexandre Capt, Landser (FR)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/960,771

(22) Filed: Apr. 24, 2018

(65) Prior Publication Data

US 2019/0324705 A1 Oct. 24, 2019

(51) Int. Cl.
*G06F 3/14* (2006.01)
*G06F 3/16* (2006.01)
*G06F 3/0488* (2013.01)
*H04M 1/725* (2006.01)

(52) U.S. Cl.
CPC ........ *G06F 3/1454* (2013.01); *G06F 3/04883* (2013.01); *G06F 3/167* (2013.01); *H04M 1/72527* (2013.01)

(58) Field of Classification Search
None
See application file for complete search history.

(56) References Cited

U.S. PATENT DOCUMENTS

| 9,547,467 | B1* | 1/2017 | DeLuca | G06F 3/1423 |
| 2013/0222266 | A1* | 8/2013 | Gardenfors | G06F 3/1446 345/173 |
| 2015/0186029 | A1* | 7/2015 | Khani | G06F 3/04883 345/173 |
| 2016/0224307 | A1* | 8/2016 | Sieger | G06F 3/1446 |

OTHER PUBLICATIONS

Seifert et al., "Extending Mobile Interfaces with External Screens" in 14th International Conference on Human-Computer Interaction (INTERACT), Springer, Lecture Notes in Computer Science, LNCS-8118 (Part II), pp. 722-729 (2013).

* cited by examiner

*Primary Examiner* — David D Davis
(74) *Attorney, Agent, or Firm* — Finch & Maloney PLLC

(57) ABSTRACT

Techniques for utilizing a conglomeration of device screens (e.g., mobile device screens and/or tablet screens) in a collective manner to display an image such that the image is distributed across the screens and the conglomeration of screens act as a single screen. A plurality of screen bearing devices are arranged in a tangential rectilinear layout. The layout can be arbitrary and need not be an aligned grid. A swipe or other gesture that is performed across all of the screens is received in a distributed fashion. Based upon the received plurality of gesture/swipe objects and their associated parameters, a coordinate mapping may be performed with respect to each device/screen such that a respective portion of an image to be displayed in a distributed fashion is mapped to a particular device/screen.

20 Claims, 14 Drawing Sheets

Note:
- Device 1 Screen Size: $X_1$ by $Y_1$
- Device 2 Screen Size: $X_2$ by $Y_2$
- Device 3 Screen Size: $X_3$ by $Y_3$

GESTURE-BASED ALIGNMENT METHODOLOGY TO EXTEND THE VIEWPORT ON ADJACENT TOUCH SCREEN DEVICES

FIELD OF THE DISCLOSURE

This disclosure provides techniques related to user interface and user interaction within the context of touch screen devices, and more particularly to gesture-based techniques to display an image across multiple devices/screens.

BACKGROUND

Touch screens (especially mobile phones and tablets) that are used by a single user are ubiquitous. Leveraging those screens to benefit from a larger viewport is desirable in many use cases to achieve a larger viewport or to allow multiple interactions on the same application for collaborative work. For example, in cases where a large computer screen is not available, it is desirable to leverage a multitude of available mobile devices (e.g., smartphones and/or tablets) to display an image distributed across multiple screens as if the multiple screens comprised a single screen. However, no known techniques exist for rapidly establishing a distributed display and control system across a set of devices/screens. Exacerbating this problem is that mobile or tablet screens have different sizes and form factors. Further, pairing mechanisms often assume that devices are placed in a grid. Further, typically screen alignment is performed using a virtual representation of the screen rather than its physical location. One possible technique, for instance, would be for a user to choose the location of the screen relative to another screen (left, right, bottom, top), but there is an assumption that the devices are perfectly aligned to each other. Moreover, while an operating system might allow heterogenous screens to be used, there is a further presumption that the screens are controlled via a single display unit. Thus, there is a need for techniques to expand a given viewport to multiple devices.

DETAILED DESCRIPTION

Figure 1A:
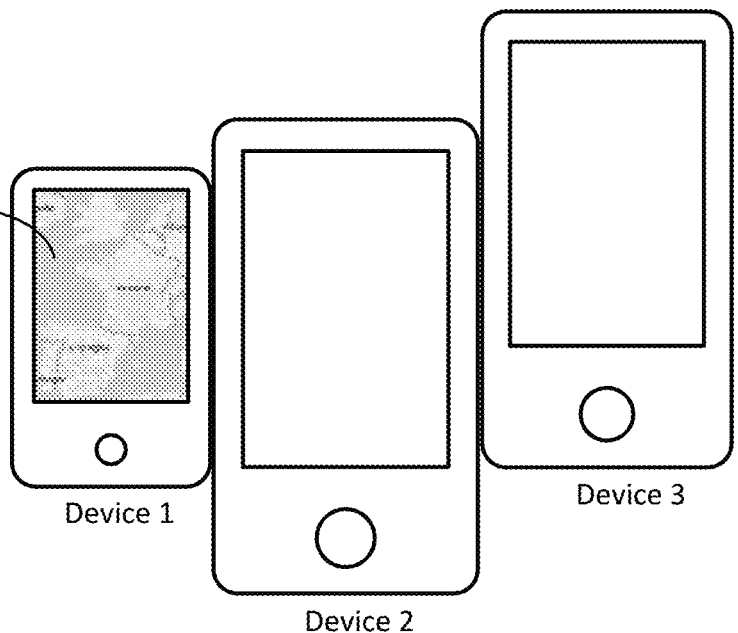
FIGS. 1a-1f conceptually illustrate a methodology for expanding the viewport of one touch screen device to multiple touch screen devices, according to an embodiment of the present disclosure.

The present disclosure relates to gesture-based techniques for leveraging a plurality of devices bearing a respective touch screen (e.g., mobile device screens and/or tablet screens) in a collective or conglomerate manner to display an image such that the image is distributed across the screens. In this manner, the conglomeration of screens act as a single logical screen or viewing port for viewing an image. In particular, according to some embodiments, a set of screen-bearing devices are arranged in a tangential rectilinear layout. The devices may be arranged such that each of devices is adjacent to at least one other device in the collective. Other than that, the devices can be arranged in an otherwise arbitrary manner (that is, the devices need not be perfectly aligned or otherwise arranged in a regular or symmetrical grid). To this end, and as will be described below, the collection of devices may also be arranged such that one device exhibits a relative displacement with respect to another adjacent (tangential) device other in one dimension. The screens may be heterogeneous in their dimensions (form factor), resolution and/or other display capabilities.

According to one embodiment of the present disclosure, to invoke the conglomerate mode in which a plurality of screens act as a single logical screen or viewing port, a set of devices may be arranged in a rectilinear fashion in which any two devices are at least partially adjacent to one another. A gesture referred to herein as a composite gesture comprising a single logical gesture that addresses the plurality of adjacent devices/screens as a single device/screen may then be performed by a user. A composite gesture may be comprised of a one or more physical gestures forming one continuous gesture, wherein each physical gesture is associated with a respective device within the rectilinear arrangement. For example, according to one embodiment, a user may perform a logical "swipe" gesture that spans across all of the devices in the arrangement by swiping across all the devices by moving a finger in a particular contour or arc or line across all devices (from one adjacent device to the next).

According to one embodiment of the present disclosure, each physical gesture (or each portion of one continuous gesture, as the case may be) associated with a respective device may be represented utilizing a data structure herein referred to as a gesture object that may further comprise data and other parameters describing the respective physical gesture. As described in more detail below, among other attributes, each physical gesture may comprise data/parameters indicating the coordinates associated with the physical gesture such as the entry/exit coordinates of the gesture on the screen of the associated device. According to some embodiments of the present disclosure, each gesture object may further comprise metadata describing various known (or knowable via, for example, device interrogation or user prompting) attributes of the associated device upon which the physical gesture is performed such as the screen size, screen resolution, and other screen related parameters.

For example, according to one embodiment of the present disclosure, each gesture object includes one or more attributes including entry and exit coordinates of the gesture on the device as well as temporal data such as time stamp(s) indicating what time the gesture was performed as well as time stamps relative to each coordinate comprising the gesture. Based upon the received plurality of gesture/swipe objects and their associated parameters, a coordinate mapping may be performed with respect to each device/screen such that the shape of the extended viewport formed by the collective of devices is computable. In addition, a respective portion or region of the image to be displayed is mapped to a particular device/screen, taking into account the shape of the viewport. Based upon this mapping information, each device/screen can then be caused to display the respective portion or region of the image mapped to that device.

According to further embodiments of the present disclosure, panning, zooming and other image manipulation functions may be performed with respect to the conglomeration of devices/screens in order to provide various display controls for the displayed imaged.

Conceptual Overview

FIGS. 1a-1f conceptually illustrate a methodology for expanding the viewport of one touch screen device to multiple touch screen devices, according to an embodiment of the present disclosure. As can be seen in FIG. 1a, three touch screen devices (device 1, device 2, and device 3) are arranged adjacent to one another. The sides of the respective housings of the devices are shown as touching, but there may be space between devices too, so long as a gesture can be provided to each of the devices. Further note that the placement of one device relative to its neighbor(s) can be arbitrary, so long as there is some overlap along the neighboring device sides, whether that overlap is between two horizontal sides or two vertical sides. As will be further appreciated, while three devices are shown in this example arrangement, any number of devices can be used and arranged in any layout. As can be further seen, a portion of the image to be displayed on the devices is currently displayed on device 1. The image to be displayed on the collection of devices can be thought of as a global image. In addition, the portion of the image currently displayed can be thought of as a seed image, as it can be used as a reference or key that dictates which portion of the global image will be provided to each of the other devices in the collection, once the shape of the extended view port is known.

Figure 1B:
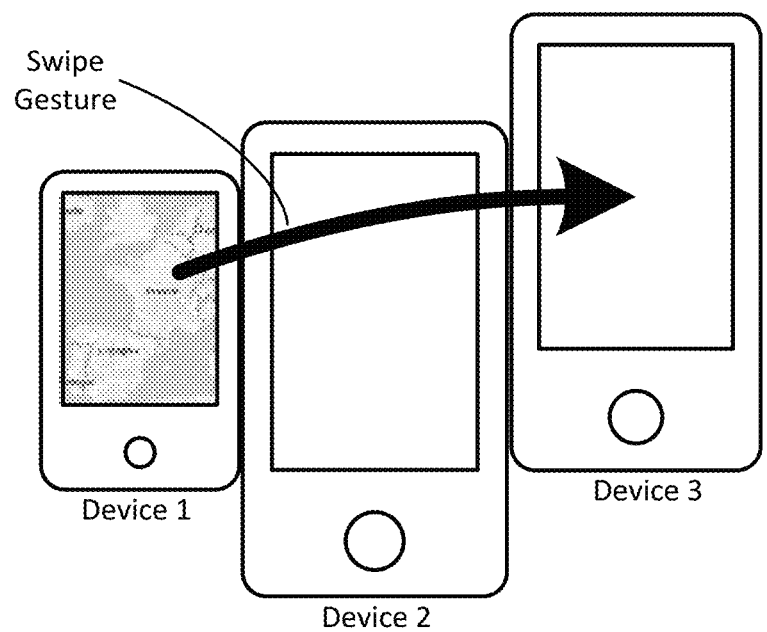

FIG. 1b shows a swipe gesture applied to the collection of devices. Note that each device effectively has a start point and an end point along the gesture path. For instance, on device 1 the start point is somewhere within the currently displayed image and the stop point is along the far-right edge of the respective screen; on device 2 the start point is along the far-left edge of the respective screen and the stop point is along the far-right edge of the respective screen; and; on device 3 the start point is along the far-left edge of the respective screen and the stop point is somewhere within the middle of the screen. While the swipe path is shown as arching or curved, it could also be, for example, a straight line or an irregular line with one or more corners or direction changes, so long as the respective start and stop points of each given screen can be determined.

Figure 1C:
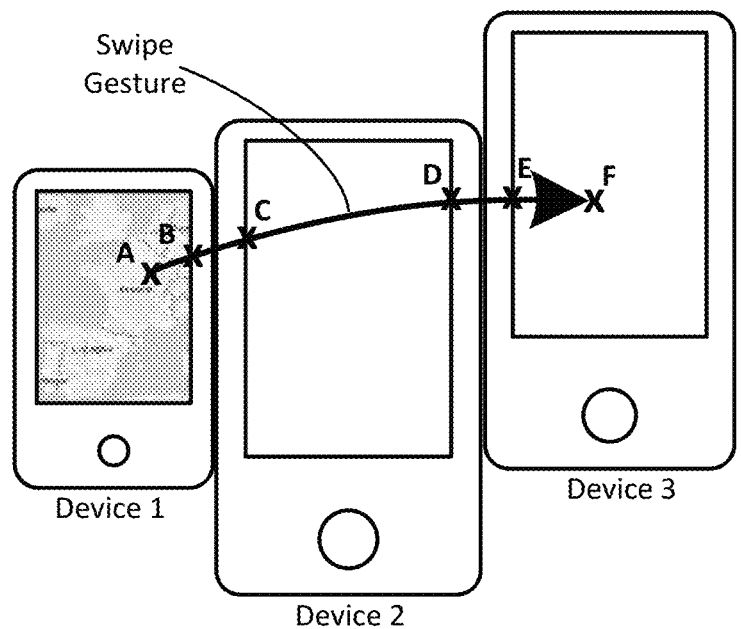
Figure 1D:
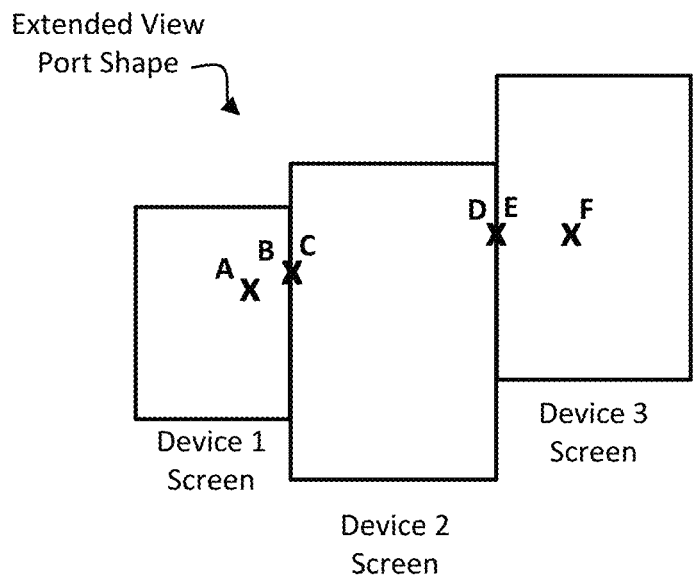

FIG. 1c shows the respective start and stop points labeled. In particular: A and B are the start and stop points, respectively on device 1; C and D are the start and stop points, respectively on device 2; and E and F are the start and stop points, respectively on device 3. Further note that each of the start and stop points can be associated with a time stamp, which can be used to determine the direction of the gesture, according to some embodiments. Because the size of each touch screen is known, as well as the path across those screens (based on respective start and stop points), the shape of the extended viewport can be determined. In particular, and with reference now to FIG. 1d, a box representing each screen size is shown. Each box is marked with the respective start and stop points of the gesture. As can be further seen, the stop point B of device 1 has been aligned with the start point C of device 2; likewise, the stop point D of device 2 has been aligned with the start point E of device 3. With the three boxes so aligned, tracing the outermost perimeter of the three boxes effectively provides a rectilinear shape that represents the shape of the extended viewport.

Figure 1E:
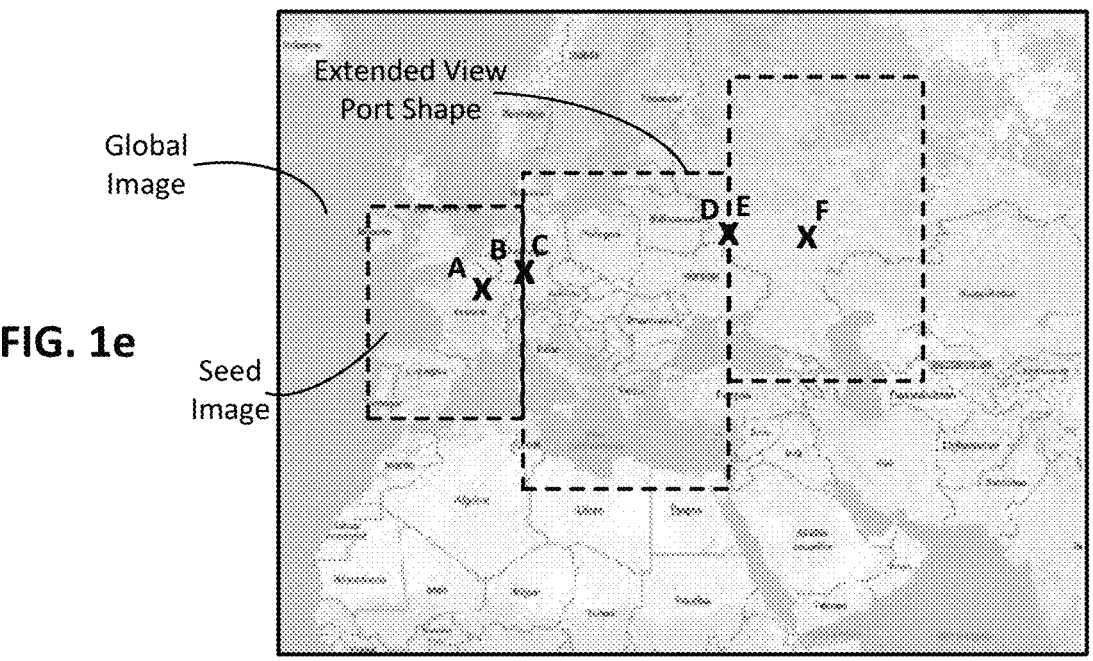
Figure 1F:
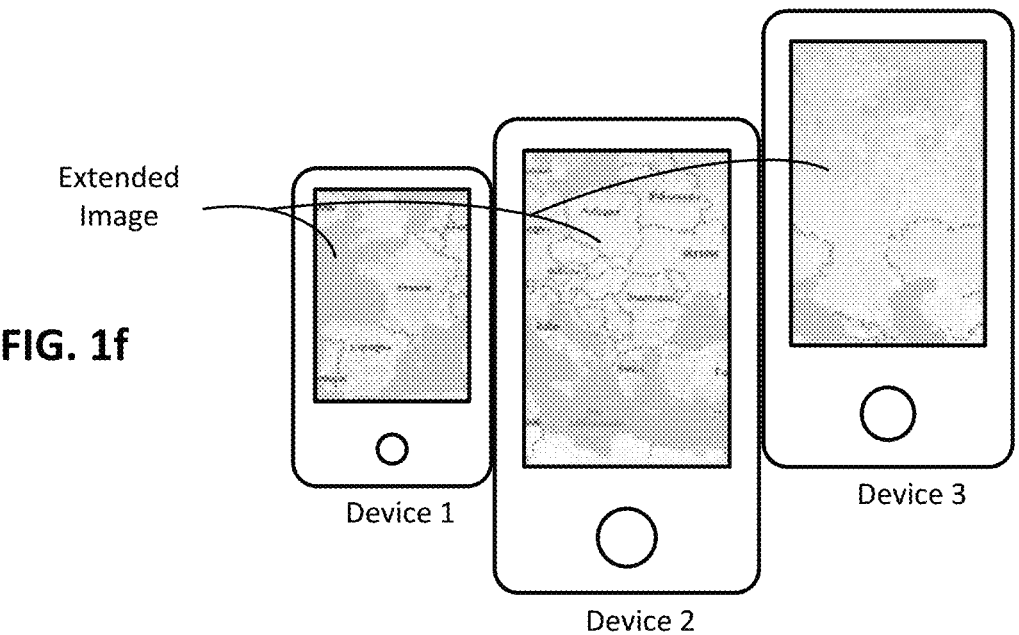
Figure 1E:
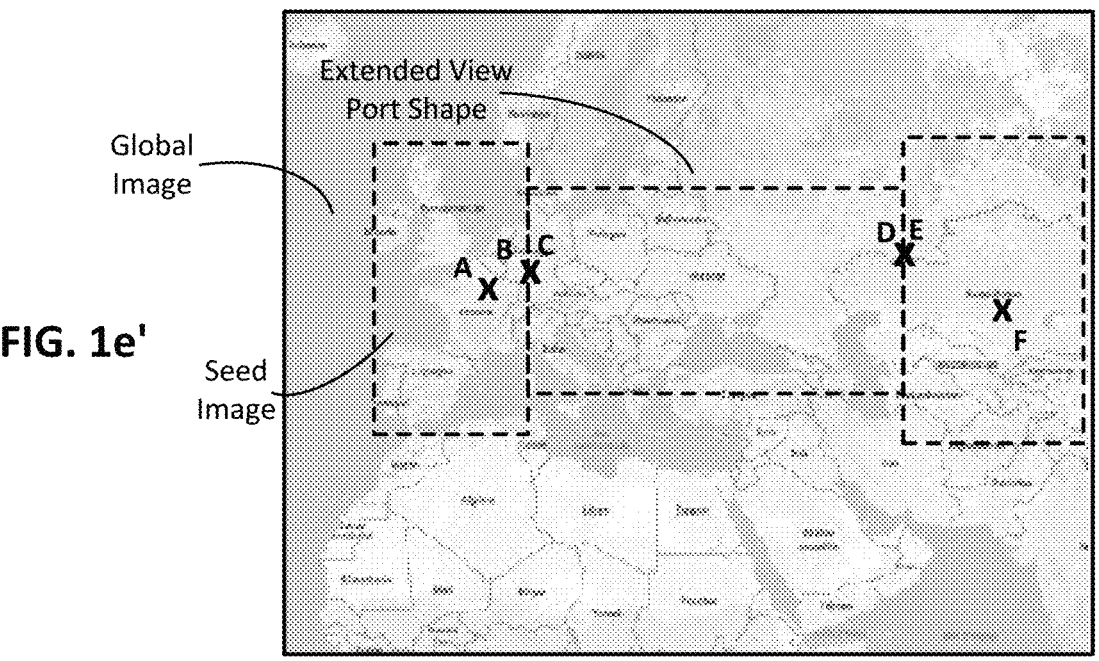
Figure 1F:
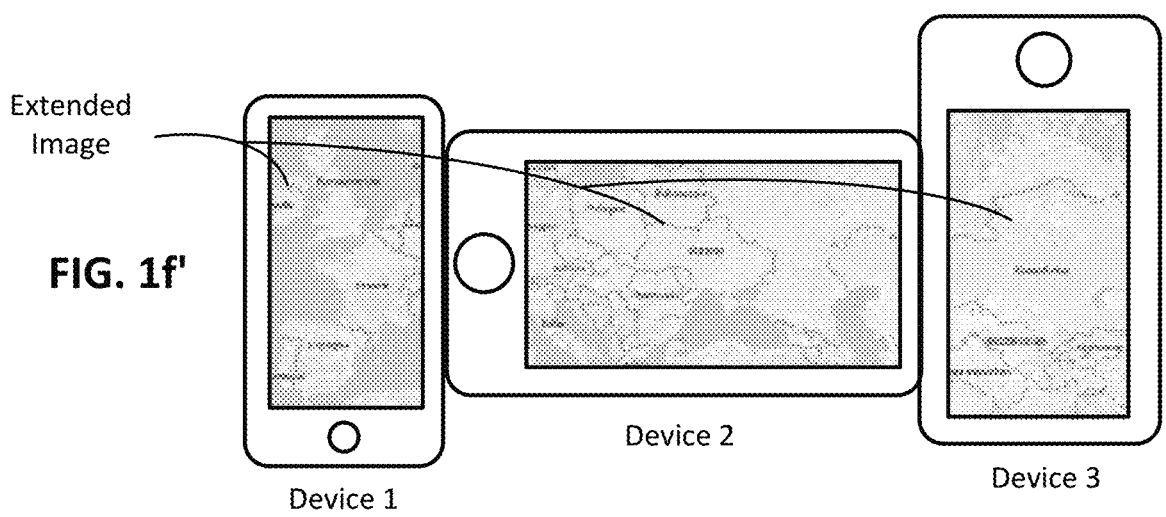

Note that the screen sizes can all the same or all different or any other combination of screen sizes. In this example, device 1 screen is $X_1$ by $Y_1$, device 2 screen is $X_2$ by $Y_2$, and device 3 screen is $X_3$ by $Y_3$. As can be further seen, the screen size can be measured in any suitable units, such as pixels, millimeters, etc. In any case, a computing entity such as a remote server or one of the three devices can receive the screen and gesture data and computer the extended viewport shape, as further discussed below. In any case, portions of the global image can effectively be mapped to respective screens making up the extended viewport shape using the seed image of device 1 as a key or starting point. In this sense, the computing entity (e.g., server or other computing system designated as master) can key off of the seed image and the now known extended view port shape to map the extended image to the devices, as best shown in FIG. 1e. Each device accordingly receives a corresponding portion of the global image, as best shown in FIG. 1f. The image displayed via the extended viewport is generally referred to as the extended image (as compared to the initial seed image).

FIGS. 1e' and 1f' show an alternate embodiment where the devices are arranged with the various orientations of the devices being diverse. In particular, device 1 is oriented in an upright fashion, device 2 is oriented in a sideways fashion, and device 3 is oriented in an upside-down fashion. As will be appreciated in light of this disclosure, the methodology provided herein operates in the same manner regardless of device orientation. In particular, each device still has a start point and an end point along the gesture path, which in turn allows a rectilinear shape that represents the shape of the extended viewport to be established (as best shown in FIG. 1e'), which in turn allows each screen of the extended viewport to be presented with a corresponding portion of the global image (as best shown in FIG. 1f'). Numerous such example embodiments will be apparent.

Methodology

Figure 2A:
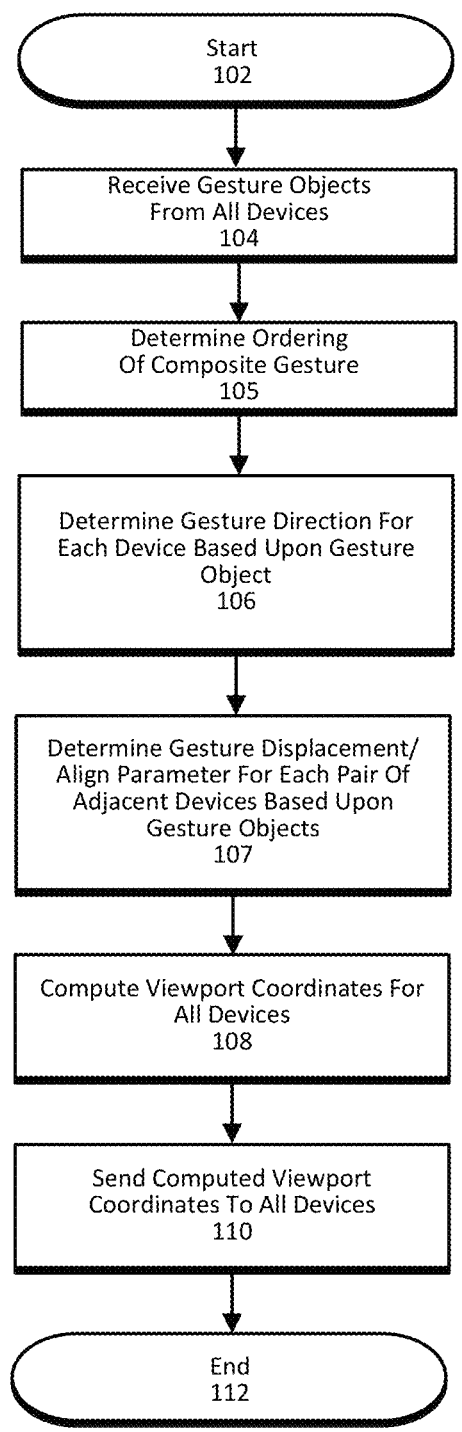
FIG. 2a is a flowchart depicting an operation of a gesture-based alignment viewport controller system according to one embodiment of the present disclosure.

FIG. 2a is a flowchart depicting an operation of a gesture-based alignment viewport controller system according to one embodiment of the present disclosure. For purposes of this discussion, and as previously discussed, it is assumed that an image is to be displayed across a plurality of devices arranged in a rectilinear fashion such that any two devices are adjacent to one another. As will be described in detail below a gesture-based alignment viewport controller system may receive a plurality of gesture objects each associated with a respective device. Based upon the received gesture objects, the gesture-based alignment viewport controller system determines a region of the image to be displayed on each respective device and further cause each device to display the respective region of the image assigned to that device.

As will be further described below, a gesture-based alignment viewport controller system may be executed on a separate server device or may execute on any one of the devices that is to display a region of the image, which is referred to herein as the server device. Each device may communicate (exchange information) with the gesture-based alignment viewport controller system, for example utilizing a wireless communication protocol such as Bluetooth, Wi-Fi, etc.

Referring to FIG. 2a, the process is initiated in 102. The user will perform a composite gesture across all devices. The composite gesture may comprise a collection of gestures that are performed with respect to each individual device. For example, if two devices are arranged adjacent to one another in the horizontal dimension, the user may swipe across both devices. The swiping operation across both devices comprises a logical composite gesture, which is composed of two physical gestures—one on the first device and the second on the second device. Each device will then transmit a data structure referred to herein as a gesture object encapsulating information associated with the gesture performed on that device. Further, as the composite gesture comprises a collection of individual physical gestures performed temporally, each physical gesture will have an associated temporal ordering with respect to the logical composite gesture.

In 104, gesture objects are received from all devices. Note the gesture objects can be received in real-time as the gesture progresses across the various device screens, and gesture objects associated with one device thus have a temporal relationship with respect to the other gesture objects associated with the other devices (e.g., the gesture objects are received in a sequence that reflects the order and time in which they were triggered by the composite gesture). As will become evident below, gesture objects are required from all devices in order to determine the relative orientation of each gesture with respect to a particular device in a first dimension (e.g., UP (y dimension), DOWN (y dimension), LEFT (x dimension) and RIGHT (x dimension)) as well as a displacement/align parameter in with respect to a second dimension (either x or y), which indicates an offset between two adjacent devices. As will be described below, a gesture object may comprise information relating to a gesture received on a respective device as well as additional information such as, for example, metadata regarding the respective device's capabilities such as screen size, screen resolution, and time-related data (e.g., timestamps for start and stop points). This metadata, may be utilized to determine respective region coordinates for each device that is to display a portion of an image. According to alternative embodiments, the metadata describing device and display capabilities may be pre-stored on the server.

Once all devices have transmitted their respective gesture objects to the server, flow continues with 105 whereby an ordering is determined for the received gesture objects. In particular, according to one embodiment of the present disclosure, each gesture object may be associated with a discrete value indicating a respective ordering (temporal or otherwise) within the composite gesture, which represents the order in which that gesture was performed as compared to gestures on the other devices. As previously described, the ordering of the gesture objects indicates an order in which the gesture objects were generated as part of the composite object by a user.

According to one embodiment of the present disclosure, the ordering of gesture objects may be determined based upon temporal data such as timestamp data. In particular, according to one embodiment of the present disclosure, a server or device server may generate an associated timestamp when each gesture object is received from each respective device. Because each device may not transmit an associated gesture object until the gesture has completed on that device, according to some embodiments, this server-based timestamp may be utilized to determine a relative ordering of received gesture objects with respect to the composite gesture which they comprise. According to other embodiments of the present disclosure, respective timestamps for each gesture object may be generated locally at each device where the gesture is being performed. Assuming a reasonable clock synchronization between devices, this timestamp may also serve to determine a relative ordering of gesture objects received from all devices. According to alternative embodiments of the present disclosure, a gesture object may further comprise particular gesture parameters associated with particular gesture operations such as a drag, for example. These gesture parameters may also comprise timestamp information, which may be utilized to determine a relative ordering of gestures between adjacent devices.

In 106, for each device, a gesture direction parameter is determined. In particular, according to one embodiment of the present disclosure, a gesture direction parameter indicates a direction a gesture object was performed with respect to a device upon which a gesture (which may comprise a component portion of a composite gesture) was performed. According to one embodiment of the present disclosure, a gesture direction parameter may be one of "UP", "DOWN", "LEFT" "RIGHT", "BEGIN COMPOSITE GESTURE" or "END COMPOSITE GESTURE". A gesture direction parameter may be determined based upon the beginning and ending coordinates of a gesture performed on a respective device and indicates a particular direction that a gesture was performed. For example, if the beginning gesture x-coordinate is of value 0 and ending gesture x-coordinate is of value $X_{max}$ where $X_{max}$ represents the maximum x-coordinate for the respective device upon which the gesture was performed, this may be interpreted as a gesture in the "Right" direction. The table below summarizes gesture direction parameter computations based and associated coordinate information associated with such inference according to one embodiment of the present disclosure:

| Direction | Beginning x-Coordinate | Ending x-Coordinate | Beginning y-Coordinate | Ending y-Coordinate |
|---|---|---|---|---|
| RIGHT | 0 | $X_{Max}$ | — | — |
| LEFT | $X_{Max}$ | 0 | — | — |
| DOWN | — | — | 0 | $Y_{Max}$ |
| UP | — | — | $Y_{Max}$ | 0 |
| BEGIN COMPOSITE GESTURE | >0 | — | >0 | — |
| END COMPOSITE GESTURE | — | >0 | — | >0 |

A more detailed process for determining gesture direction information is described below with respect to FIG. 2b.

In 107, for each pair of adjacent devices, a displacement/align parameter is determined. As described in more detail below, a displacement parameter may indicate the degree to which two adjacent devices are displaced with respect to one another in a particular dimension. A more detailed process for determining an align/anchor parameter is described below with respect to FIG. 2b.

In 108, viewport coordinates are computed for each device that is to display a region of the image. In particular, coordinates indicating the region of the image to be displayed by a particular device are determined based upon the gesture direction information and the displacement parameter information. A more detailed process for determining viewport coordinates is described below with respect to FIG. 2c.

In 110, the computed viewport coordinates are transmitted to each respective device. As previously described, the devices may communicate with a central server via, for example, a wireless protocol such as Bluetooth, in which case the central server upon receiving all gesture objects from communicating devices arranged in a particular layout performs the process shown in FIG. 2a and then transmits the viewport coordinates to each communicating device. According to one embodiment of the present disclosure, the server may also store the image to be displayed and only transmit data representing the region/portion of the image to be displayed on a particular device. According to alternative embodiments, each device may store a local copy of the aggregate image, in which case the server need only transmit the coordinates of the region that each device is to display. The process ends in 112.

Figure 2B:
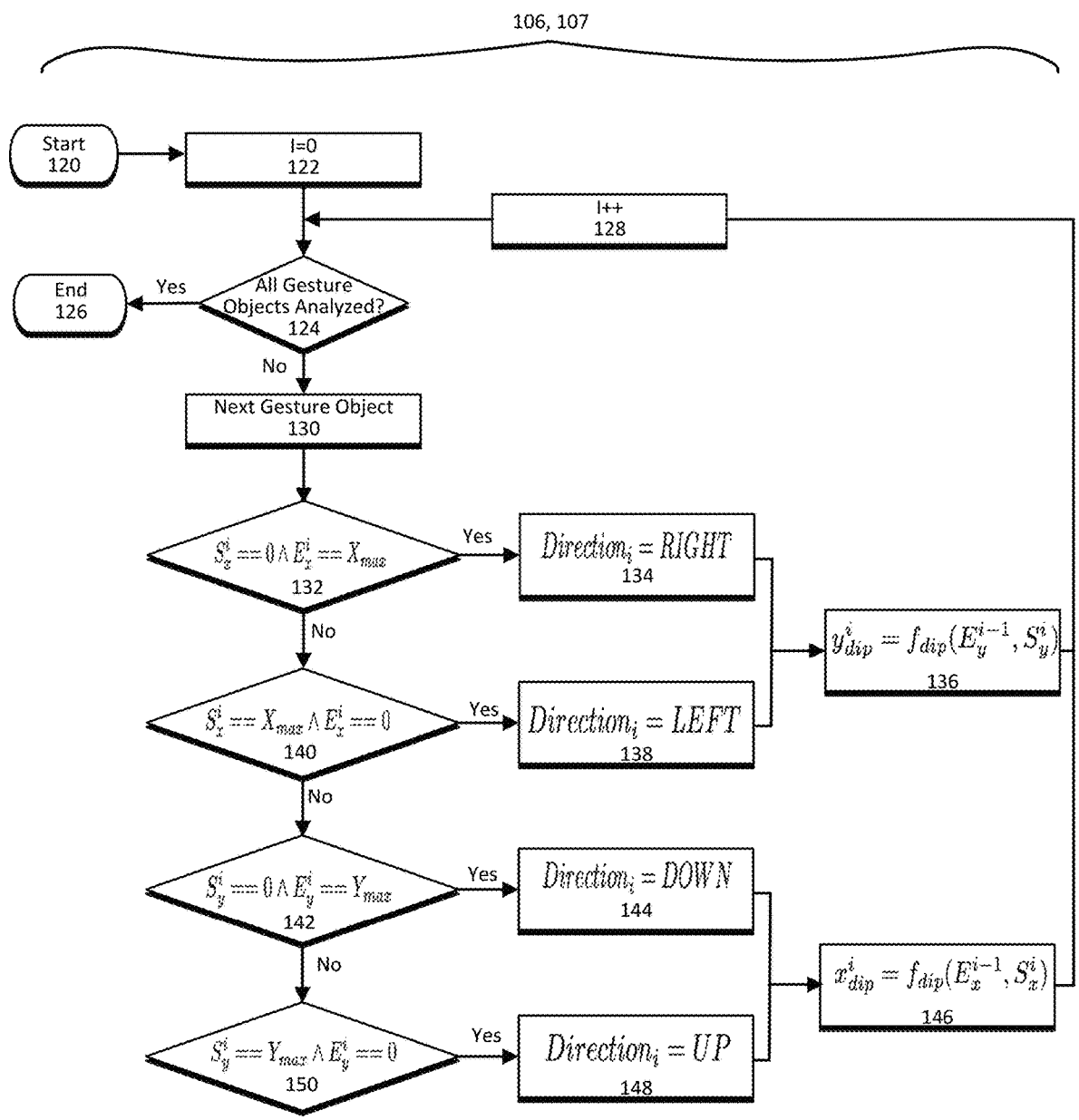
FIG. 2b is a flowchart depicting a detailed process for determining gesture direction information and displacement parameters between adjacent devices according to one embodiment of the present disclosure.

FIG. 2b is a flowchart depicting a detailed process for determining gesture direction information and displacement parameters between adjacent devices according to one embodiment of the present disclosure. The process shown in FIG. 2b corresponds to 106 and 107 in FIG. 2a and is performed with respect to each gesture object. The process is initiated in 120. It is assumed for purposes of this discussion that an ordering has been determined for all gesture objects received as described above with respect to 105, for example based upon timestamp information. As previously discussed, the ordering of gesture objects may be utilized to define an ordering of gestures comprising a composite gesture performed on a set of devices arranged in a rectilinear fashion.

In 122, a counter i referencing each device is set to 0. The counter i may be used to iterate over all gesture objects based upon the ordering performed in 105 of FIG. 2a. In 124 it is determined whether all gesture objects have been analyzed. If so ('Yes' branch of 124), the process ends in 126. Otherwise ('No' branch of 124) flow continues with 130 and the next gesture object in the ordering is considered. For purposes of the present discussion, the following nomenclature will be utilized:

$S_{x,y}^i$—Starting coordinate of the ith gesture (x or y)
$E_{x,y}^i$—Ending coordinate of the ith gesture (x or y)

The starting and ending coordinate may be obtained from the gesture object, for example by examining the timestamps associated with a gesture (e.g., a swipe).

In 132, it is determined whether the current gesture starts at the left of the screen and ends at the right of the screen according to the relationship $S_x^i==0 \wedge E_x^i==X_{Max}$. If so ('Yes' branch of 132), flow continues with 134 and the current direction parameter is set to RIGHT, $DIRECTION_i=RIGHT$. If not ('No branch of 132), flow continues with 140 and it is determined whether the current gesture starts at the right of the screen and ends at the left of the screen according to the relationship: $S_x^i==X_{Max} \wedge E_x^i==0$. If so ('Yes' branch of 140), flow continues with 138 and the current direction parameter is set to LEFT, $DIRECTION_i=LEFT$.

If the current direction parameter $DIRECTION_i$ is LEFT or RIGHT, in 136 the current displacement parameter is set according to the relationship: $y_{dip}^i=f_{dip}(E_y^{i-1},S_y^i)$, where $f_{dip}$ is a function that maps they-coordinate of the previous gesture endpoint and the y-coordinate of the current gesture begin point to a number that represents the displacement of the two adjacent devices (previous and current) in the y direction. Flow then continues with 128 where the gesture object counter i is incremented and the next gesture object is analyzed.

If the current gesture is neither LEFT nor RIGHT ('No' branch of 140), flow continues with 142 whereby, it is determined whether the current gesture starts at the top of the screen and ends at the bottom of the screen according to the relationship $S_y^i==0 \wedge E_y^i==Y_{Max}$. If so ('Yes' branch of 142), flow continues with 144 and the current direction parameter is set to DOWN, $DIRECTION_i=DOWN$. If not ('No branch of 142), flow continues with 150 and it is determined whether the current gesture starts at the bottom of the screen and ends at the top of the screen according to the relationship: $S_y^i==Y_{Max} \wedge E_y^i==0$. If so ('Yes' branch of 150), flow continues with 148 and the current direction parameter is set to UP, $DIRECTION_i=UP$.

If the current direction parameter $DIRECTION_i$ is DOWN or UP, in 146 the current displacement parameter is set according to the relationship: $x_{dip}^i=f_{dip}(E_x^{i-1},S_x^i)$, where $f_{dip}$ is a function that maps the x-coordinate of the previous gesture endpoint and the x-coordinate of the current gesture begin point to a number that represents the displacement of the two adjacent devices (previous and current) in the x direction. Flow then continues with 128 where the gesture object counter i is incremented and the next gesture object is analyzed.

Once the gesture direction $DIRECTION_i$ and displacement parameter $y_{dip}^i$ have been determined for a particular gesture object they are stored for later use in determining viewport coordinates for each device as described below with respect to FIG. 2c.

According to some embodiments only a single condition is utilized to determine the direction of LEFT, RIGHT, UP or DOWN. In particular, according to one embodiment the following conditions are utilized:

RIGHT: $E_x^i==X_{Max}$
LEFT: $E_x^i==0$
DOWN: $E_y^i==Y_{Max}$
UP: $E_y^i==0$

This allows devices to be positioned in any arbitrary horizontal or vertical arrangement.

Figure 2C:
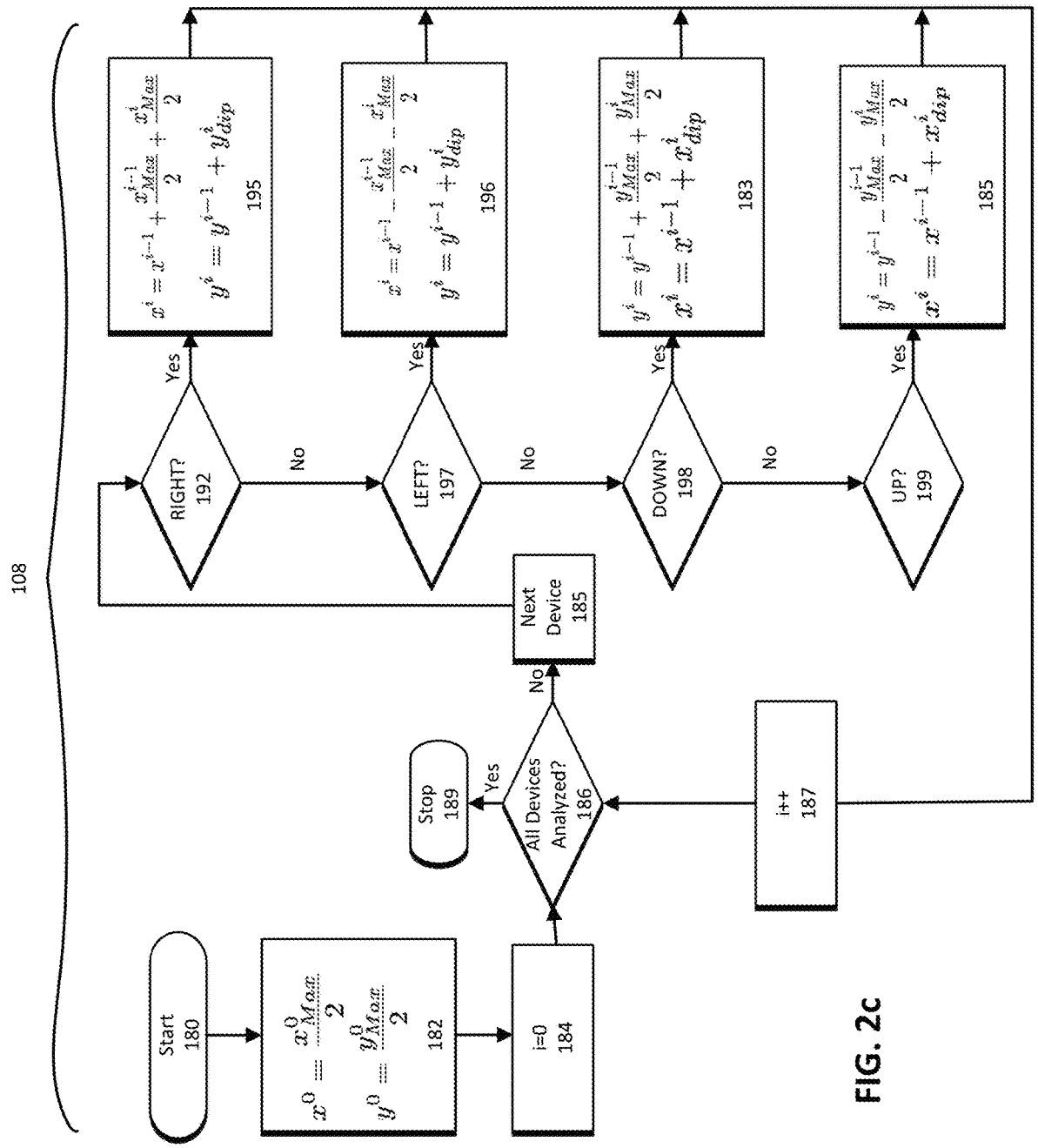
FIG. 2c is a flowchart depicting a process for determining viewport coordinates for a plurality of devices based upon a set of associated gesture objects received from those devices according to one embodiment of the present disclosure.

FIG. 2c is a flowchart depicting a process for determining viewport coordinates for a plurality of devices based upon a set of associated gesture objects received from those devices according to one embodiment of the present disclosure. In particular, FIG. 2c depicts a method for computing the viewport coordinates based upon the direction $DIRECTION_i$ and displacement parameter $y_{dip}^i$ as computed in FIG. 2b. The process depicted in FIG. 2c represents 108 of FIG. 2a.

For purposes of the present discussion, the following nomenclature will be utilized:

$x^i$—x-coordinate of the center of the region of the image assigned to the ith device
$y^i$—y-coordinate of the center of the region of the image assigned to the ith device The process is initiated in 180. In 182, the center coordinate of the first device determined in the ordering determined in 105 is determined as follows:

$$x^0 = \frac{x^0_{Max}}{2}$$

$$y^0 = \frac{y^0_{Max}}{2}$$

In 184, a counter parameter is initialized. The counter parameter will iterate over all devices based upon the order determined in 105 in FIG. 2a. In 186, it is determined whether viewport coordinates have been computed for all devices. If so ('Yes' branch of 186), the process ends in 189. If not ('No' branch of 186), flow continues with 185 and the next device is considered. In 192, it is determined whether the gesture for the current device is RIGHT as determined in FIG. 2b. If so ('Yes' branch of 192), flow continues with 195 whereby the center coordinates for the current device are set according to the relations:

$$x^i = x^{i-1} + \frac{x^{i-1}_{Max}}{2} + \frac{x^i_{Max}}{2}$$

$$y^i = y^{i-1} + y^i_{dip}$$

If not ('No' branch of 192), flow continues with 197 where it is determined whether the gesture for the current device is LEFT as determined in FIG. 2b. If so ('Yes' branch of 197), flow continues with 196 whereby the center coordinates for the current device are set according to the relations:

$$x^i = x^{i-1} - \frac{x^{i-1}_{Max}}{2} - \frac{x^i_{Max}}{2}$$

$$y^i = y^{i-1} + y^i_{dip}$$

If not ('No' branch of 197) flow continues with 198 where it is determined whether the gesture for the current device is DOWN as determined in FIG. 2b. If so ('Yes' branch of 198), flow continues with 183 whereby the center coordinates for the current device are set according to the relations:

$$y^i = y^{i-1} + \frac{y^{i-1}_{Max}}{2} + \frac{y^i_{Max}}{2}$$

$$x^i = x^{i-1} + x^i_{dip}$$

If not ('No branch of 198), flow continues with 199 where it is determined whether the gesture for the current device is UP as determined in FIG. 2b. If so ('Yes' branch of 199), flow continues with 185 whereby the center coordinates for the current device are set according to the relations:

$$y^i = y^{i-1} - \frac{y^{i-1}_{Max}}{2} - \frac{y^i_{Max}}{2}$$

$$x^i = x^{i-1} + x^i_{dip}$$

Figure 3:
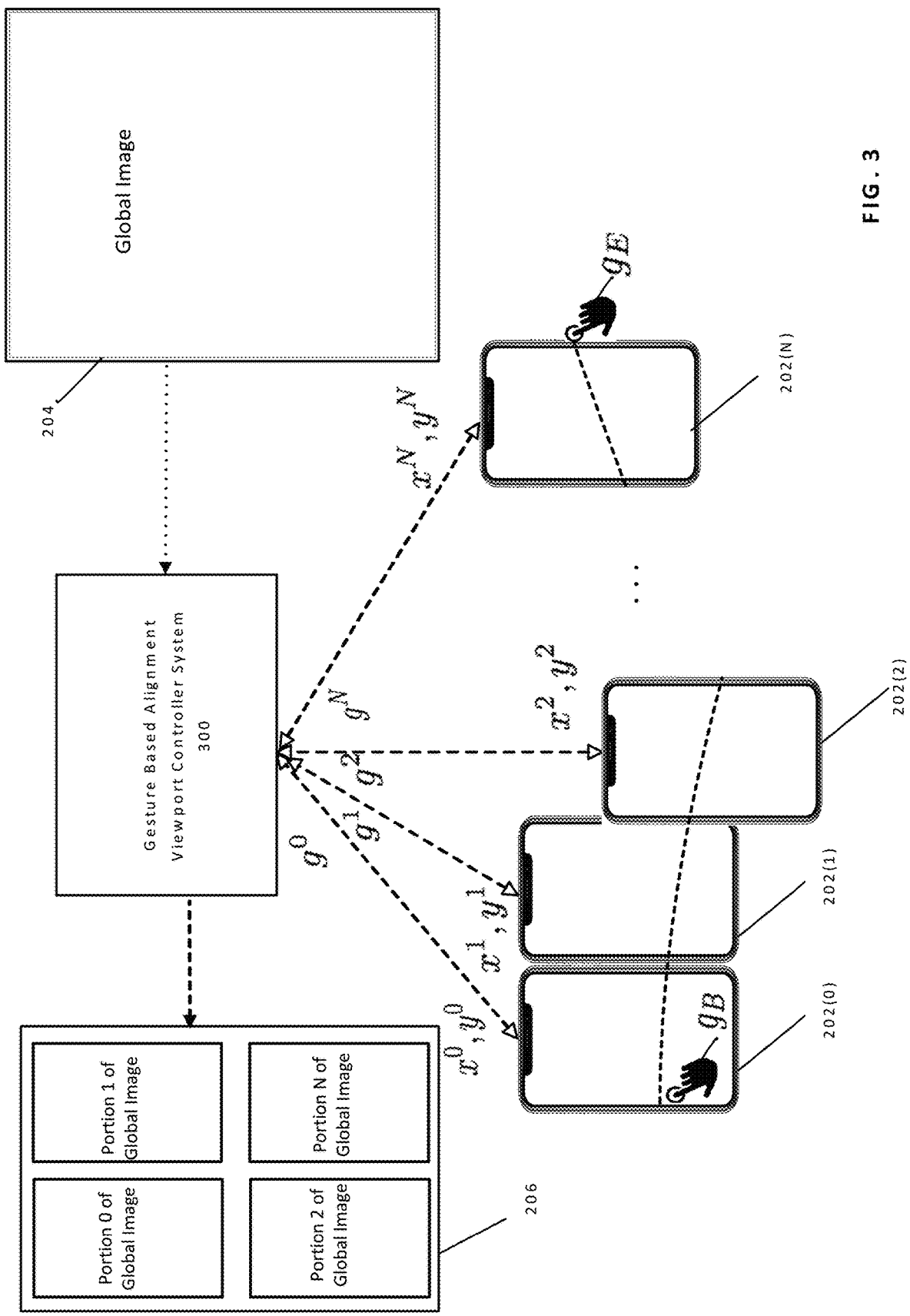
FIG. 3 is a block diagram depicting an operation of a gesture-based alignment viewport controller system according to one embodiment of the present disclosure. The label in the figure stack indicates FIG. 2a (let's get rid of the 'a' to match here).

FIG. 3 is a block diagram depicting an operation of a gesture-based alignment viewport controller system according to one embodiment of the present disclosure. Gesture-based alignment viewport controller system 300 may perform the processes depicted in FIGS. 2a-2c. As shown in FIG. 3 gesture-based alignment viewport controller system may communicate with a plurality of devices 202(0)-202(N), which may be arranged in an adjacent and rectilinear fashion. A composite gesture signified by a beginning gesture point $g_B$ and ending gesture point $g_E$ may then be performed across all devices. The composite gesture $g_B$-$g_E$ may be comprised of component gesture objects $g^0$-$g^n$ generated on each respective device 202(0)-202(N), which are each transmitted to gesture-based alignment viewport controller system 300.

In particular, each device 202(0)-202(N) may transmit a respective gesture object $g^0$-$g^N$, which is received by gesture-based alignment viewport controller system 300. Gesture-based alignment viewport controller system 300 then performs a mapping of global image 204 to be displayed on devices, such that each device displays a specific portion or region of the image 204. According to one embodiment of the present disclosure, the coordinates $x^0,y^0$; $x^1,y^1$; $x^2,y^2$; . . . , and $x^N,y^N$ of the respective global image portions 206(0), 206(1), 206(2), . . . , and 206(N) are transmitted to each respective device 202(0), 202(1), 202(2), . . . , and 202(N). According to other embodiments, the bit-mapped regions 206 of the global image 204 may be transmitted. According to still other embodiments, data associated with the mapped regions 206 of the global image 204 are transmitted so the image portion can be recreated at the respective device. In a more general sense, sufficient data or information is provided to each of the respective devices so that each device can then display a corresponding portion of the global image 204. Because the seed image is known, as well as the shape of the extended viewport, the global image portions 206(0), 206(1), 206(2), . . . , and 206(N) can be readily identified and mapped to respective device 202(0), 202(1), 202(2), . . . , and 202(N), as will be appreciated in light of this disclosure.

As shown in FIG. 3, gesture-based alignment viewport controller system 300 may execute on a separate server distinct from devices 202(0)-202(N). According to alternative embodiments of the present disclosure, gesture-based alignment controller system may operate on one of the devices 202(0)-202(N) that is to display a region of global image 204.

Figure 4:
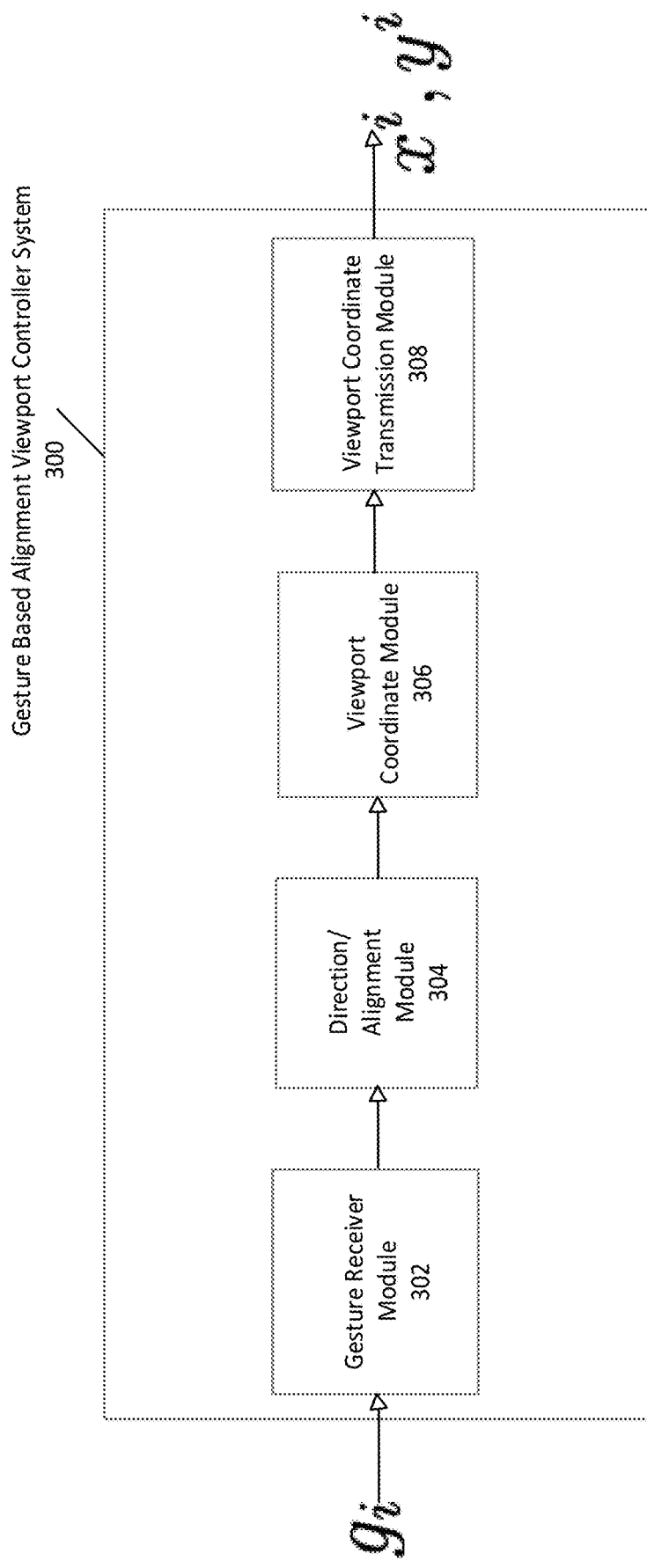
FIG. 4 is a block diagram depicting a structure of a gesture-based alignment viewport controller system according to one embodiment of the present disclosure.

FIG. 4 is a block diagram depicting a structure of a gesture-based alignment viewport controller system according to one embodiment of the present disclosure. As shown in FIG. 4, gesture-based alignment viewport controller system 300 may further comprise gesture receiver module 302, direction/alignment module 304, viewport coordinate module 306 and coordinate transmission module 308. Gesture receiver module 302 may operate to receive gesture objects from devices 202. Direction/alignment module 304 may operate to determine direction information with respect to each device from which a gesture object is received as well as determine alignment/displacement information with respect to adjacent devices. The operation of direction/alignment module 304 may be referenced with respect to FIGS. 2a-2b. Viewport coordinate module 306 may operate to determine viewport coordinates of regions of an image to be displayed on respective devices 202. The operation of viewport coordinate module 306 may be referenced with respect to FIG. 2c. Coordinate transmission module 308 may operate to transmit coordinates of regions of an image to be displayed on respective devices.

Figure 5A:
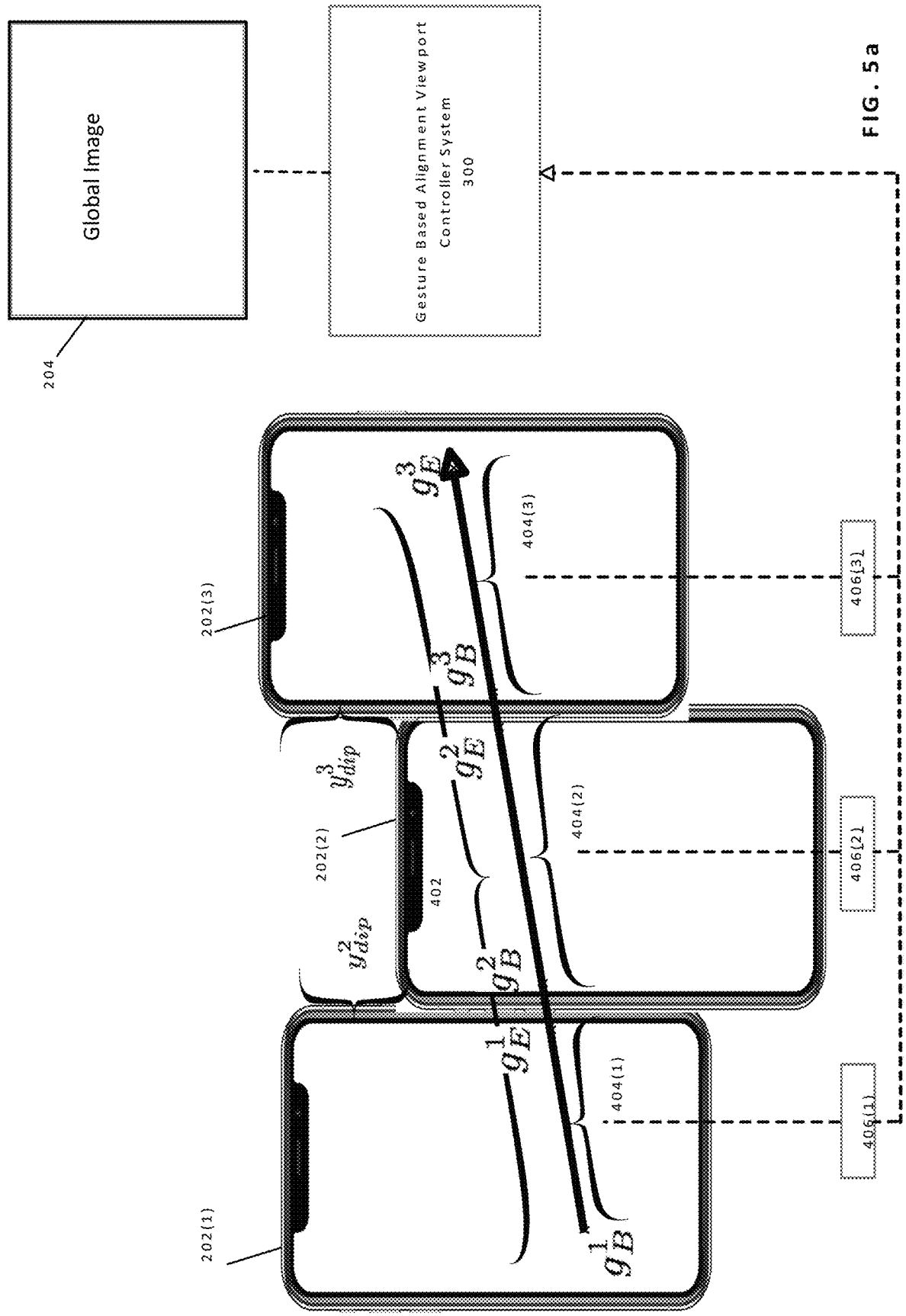
FIGS. 5a-5c depicts an example operation of a gesture-based alignment viewport controller system with respect to several devices according to one embodiment of the present disclosure.
Figure 5B:
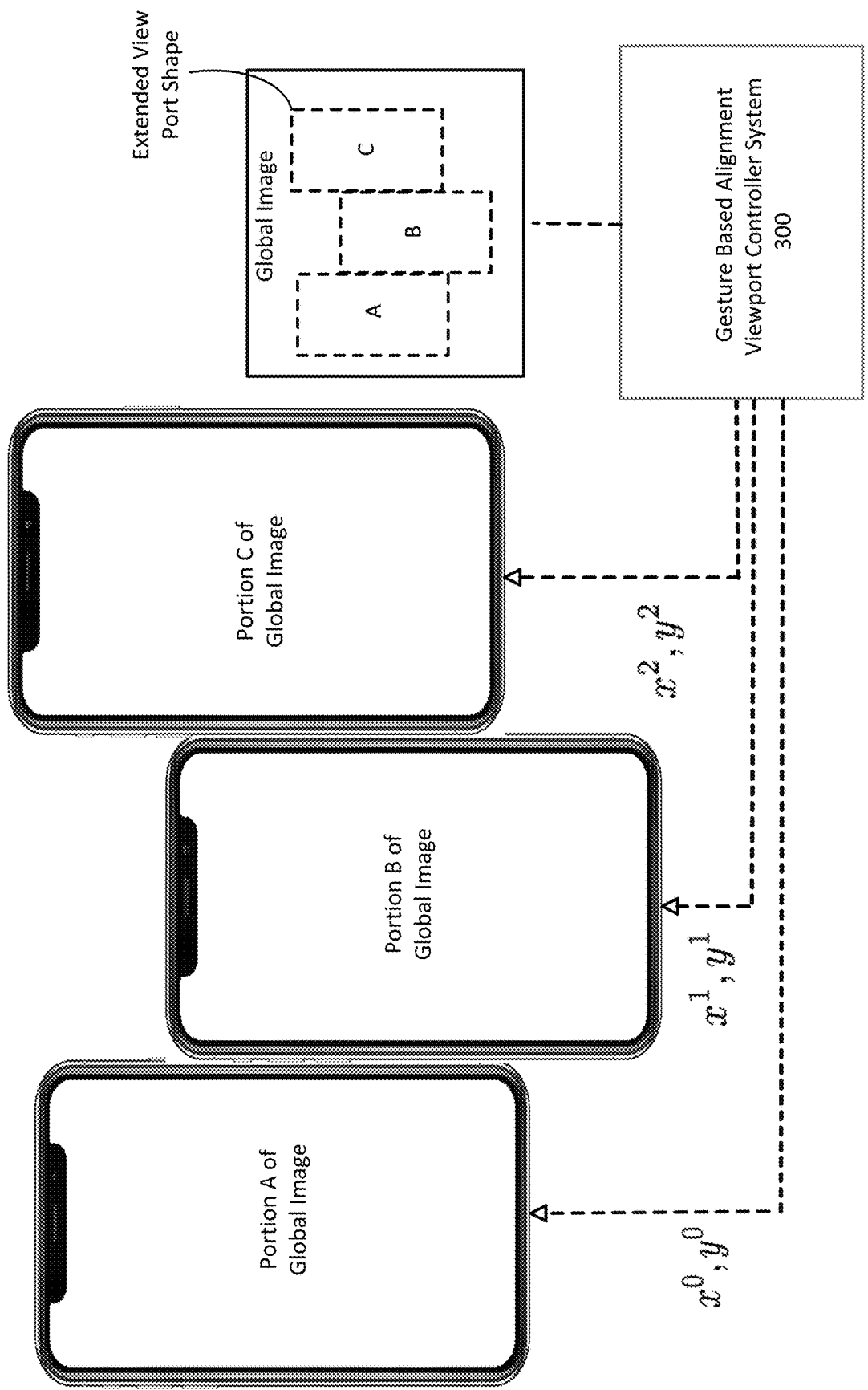

FIGS. 5a and 5b depict an example operation of a gesture-based alignment viewport controller system with respect to several devices according to one embodiment of the present disclosure. FIG. 5a shows a first phase of operation in which a composite gesture is performed. As shown in FIG. 5a, devices 202(1)-202(3) are arranged in a rectilinear and adjacent fashion and are communicating with gesture-based alignment viewport controller system 300. It is assumed that is desired to view global image 204 leveraging the multiple screens of devices 202(1)-202(3).

In order to cause the display of global image 204 leveraging the multiple screens of devices 202(1)-202(3), a user may perform a composite gesture 402 spanning across the respective device screens of devices 202(1)-202(3). Composite gesture 402 is further comprised of physical gestures 404(1)-404(3). Before performing the composite gesture 402, a user may perform a special gesture on one device to trigger the operation of gesture-based alignment viewport controller system 300.

Gestures 404(1)-404(3) are represented as gesture objects 406(1)-406(3) respectively and are transmitted to gesture-based alignment viewport controller system 300 for processing. As shown in FIG. 5a, each gesture object 406(1)-406(3) may further comprise beginning and ending coordinates of each respective gesture (e.g., $g_B^1-g_E^1, g_B^2-g_E^2, g_B^3-g_E^3$). According to one embodiment of the present disclosure, each gesture object 406(1)-406(3) may further comprise screen information associated respectively with each device 202(1)-202(3) including screen-size dimensions.

FIG. 5a shows a directionality associated with composite gesture 402 indicated by the arrow. As described with respect to FIG. 2b, the directions with respect to gestures 404(1)-404(3) is computed by direction/alignment module 304 on gesture-based alignment viewport controller system 300 based upon gesture objects 406(1)-406(3). FIG. 5a also shows displacement parameters $y_{dip}^3$, $y_{dip}^3$, which indicate the relative offset of devices 202(1), 202(2) and 202(2), 202(3) respectively. As previously described with respect to FIG. 2c, these displacement parameters are computed by gesture-based alignment viewport controller system from gesture objects 406(1)-406(3).

FIG. 5b shows a second phase of operation of the gesture-based alignment viewport controller system upon processing of gesture objects according to one embodiment of the present disclosure. In particular, upon receipt of gesture objects 406(1)-406(3), gesture-based alignment viewport controller system computes viewport coordinates, which are then transmitted to respective devices 202(1)-202(3) such that the associated regions or portions A, B, and C of the global image can be displayed on the respective devices 202(1)-202(3). Note the shape of the extended viewport formed by the rectilinear arrangement of those devices 202(1)-202(3), and how that shape corresponds to regions A, B, and C of the global image.

Figure 5C:
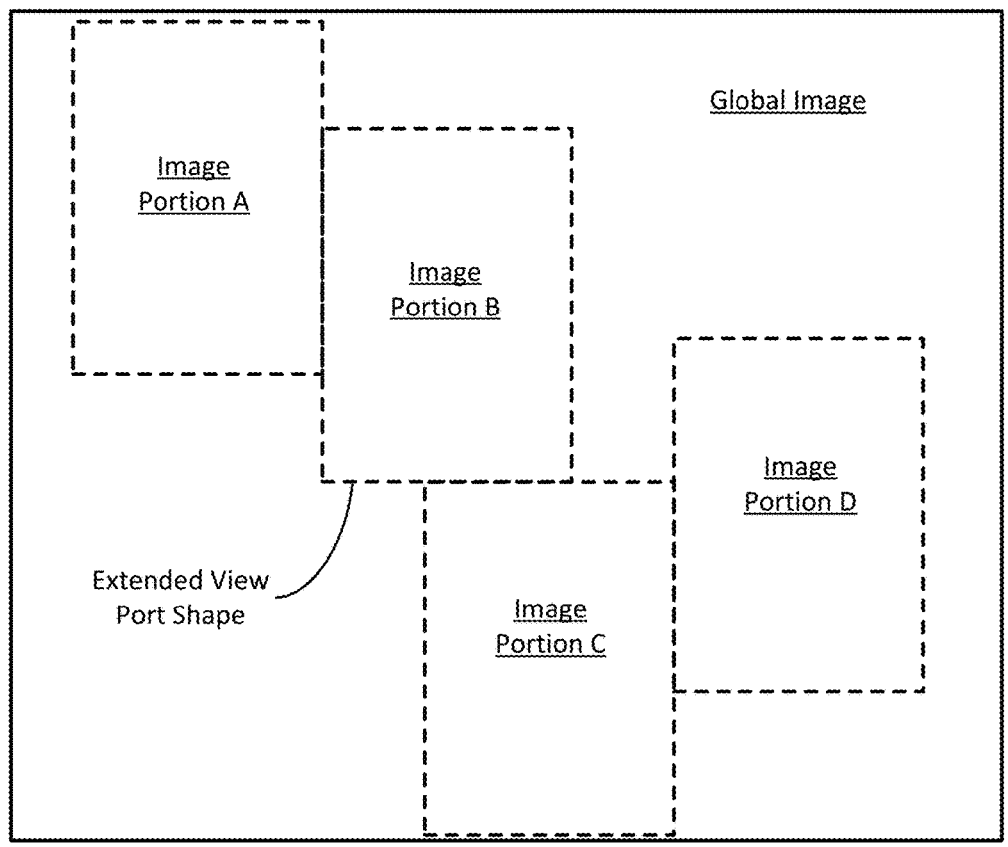
Figure 5C:
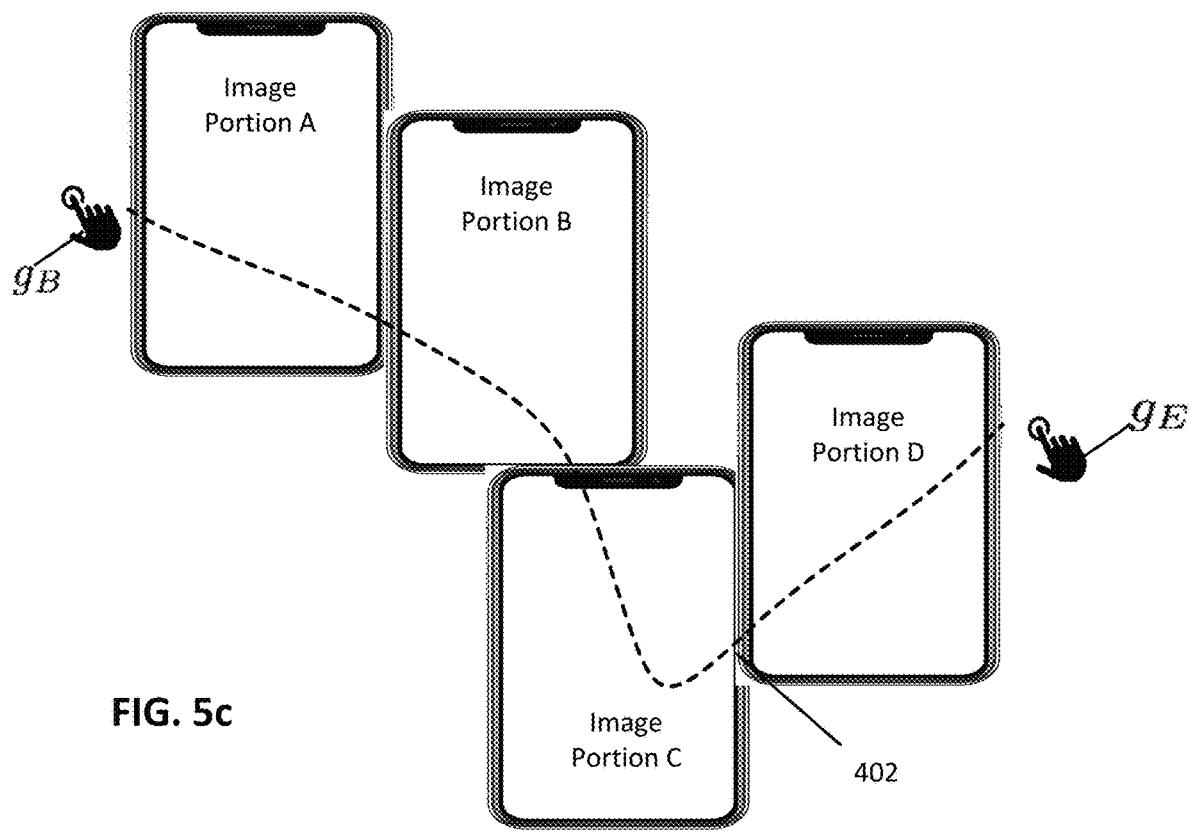

FIG. 5c illustrates another other example of an operation of a gesture-based alignment viewport controller system 300 with respect to multiple devices arranged in an arbitrary arrangement and utilizing various contours for a composite gesture 402. Again, note the shape of the extended viewport formed by the rectilinear arrangement of the four display devices in this particular example, and how that shape corresponds to regions A, B, C, and D of the global image.

Integration in Computing System and Network Environment

Figure 6A:
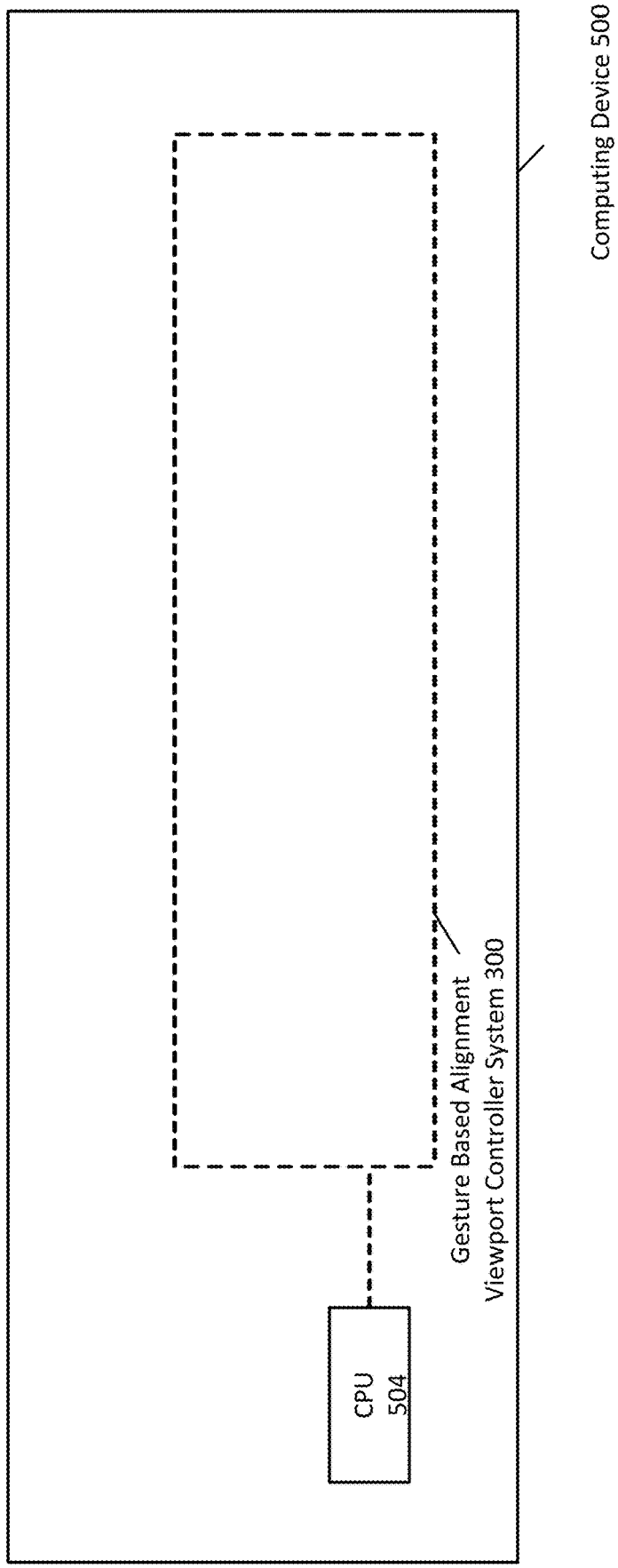
FIG. 6a illustrates an example computing system that executes a gesture-based alignment viewport controller system 300 according to one embodiment of the present disclosure.

FIG. 6a illustrates an example computing system that executes a gesture-based alignment viewport controller system 300 according to one embodiment of the present disclosure. As depicted in FIG. 6a, computing device 500 may include CPU 504 that executes one or more processes to perform gesture-based alignment viewport controller system 300 operations. In particular, CPU 504 may be further configured via programmatic instructions to execute gesture-based alignment viewport controller system 300 (as variously described herein). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. Computing device 500 can be any stand-alone computing platform, such as a desk top or work station computer, laptop computer, tablet computer, smart phone or personal digital assistant, game console, set-top box, or other suitable computing platform.

Figure 6B:
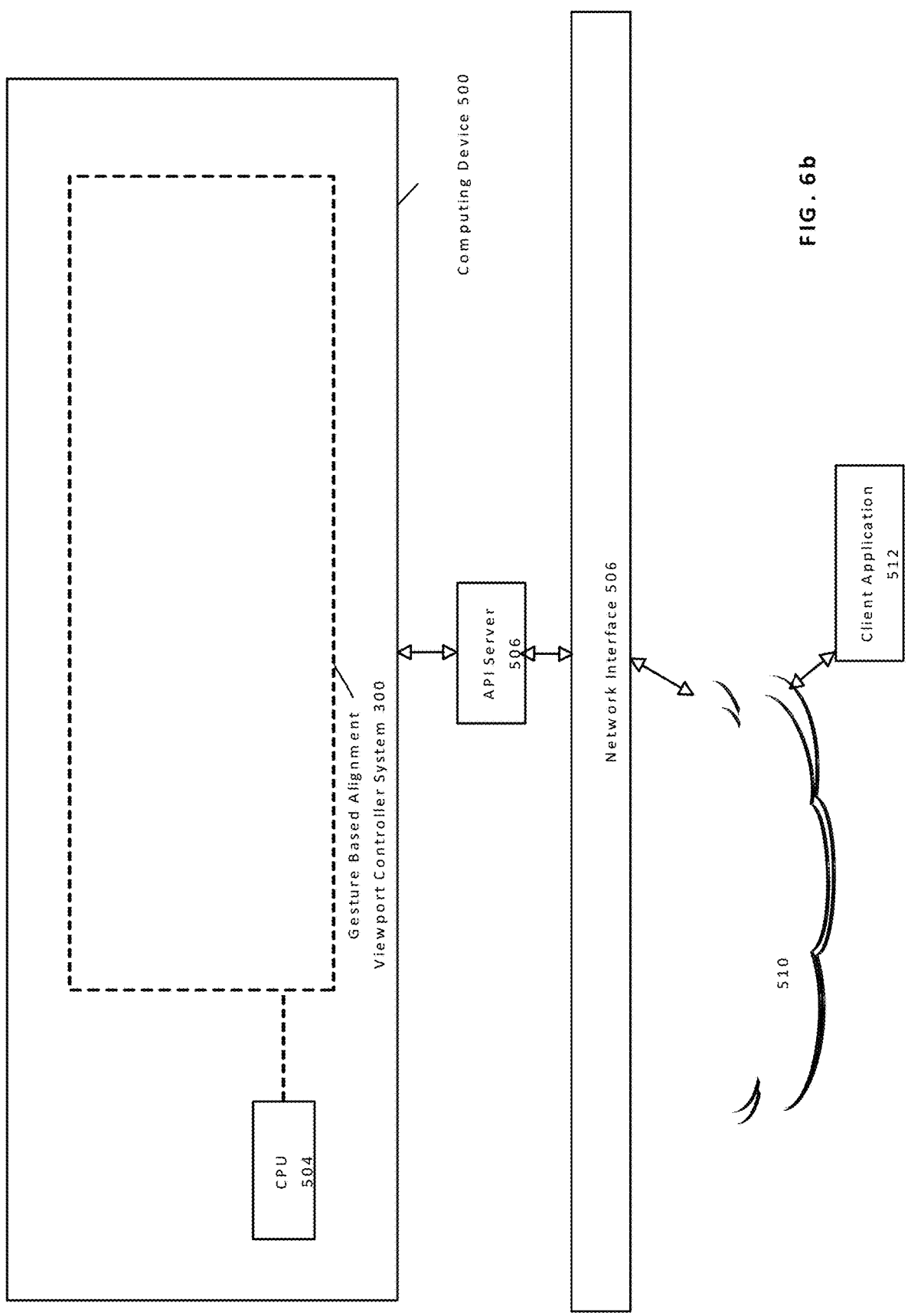
FIG. 6b illustrates an example integration of a gesture-based alignment viewport controller system 300 into a network environment according to one embodiment of the present disclosure.

FIG. 6b illustrates an example integration of a gesture-based alignment viewport controller system 300 into a network environment according to one embodiment of the present disclosure. As depicted in FIG. 6b, computing device 500 may be collocated in a cloud environment, data center, local area network ("LAN") etc. Computing device 500 shown in FIG. 6b is structured identically to the example embodiment described with respect to FIG. 6a. As shown in FIG. 6b, client application 512 may interact with computing device 500 via network 510. In particular, client application 512 may make requests and receive responses via API calls received at API server 506, which are transmitted via network 510 and network interface 508.

It will be understood that network 510 may comprise any type of public or private network including the Internet or LAN. It will be further readily understood that network 510 may comprise any type of public and/or private network including the Internet, LANs, WAN, or some combination of such networks. In this example case, computing device 500 is a server computer, and client application 512 may be any typical personal computing platform As will be further appreciated, computing device 500, whether the one shown in FIG. 6a or 6b, includes and/or otherwise has access to one or more non-transitory computer-readable media or storage devices having encoded thereon one or more computer-executable instructions or software for implementing techniques as variously described in this disclosure. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

In some example embodiments of the present disclosure, the various functional modules described herein and specifically training and/or testing of network 340, may be implemented in software, such as a set of instructions (e.g., HTML, XML, C, C++, object-oriented C, JavaScript, Java, BASIC, etc.) encoded on any non-transitory computer readable medium or computer program product (e.g., hard drive, server, disc, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (e.g., application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

Further Example Embodiments

The following examples pertain to further embodiments, from which numerous permutations and configurations will be apparent.

Example 1 is a method for displaying an image on a plurality of devices, the method comprising receiving a plurality of gesture objects, wherein each gesture object is associated with a respective device, for each gesture object, determining direction information with respect to said respective device, for each pair of adjacent devices determining a displacement parameter based upon a first and second gesture object associated respectively with said pair of adjacent devices, based upon said direction information and said displacement parameter, determining a respective region of said image to display on each device, and, causing each of said plurality of devices to display said respective region of said image.

Example 2 is the method of Example 1, wherein said direction information is one of RIGHT, LEFT, UP or DOWN.

Example 3 is the method of Example 1, wherein said displacement parameter represents a relative offset of said pair of devices in a direction perpendicular to a direction represented by said direction information.

Example 4 is the method of Example 3, wherein said plurality of devices are arranged in a rectilinear and adjacent manner.

Example 5 is the method of Example 1, wherein each of said gesture objects represents a swipe gesture.

Example 6 is the method of Example 1, wherein determining a respective region of said image to display is further determined based upon a respective device screen size associated with each of the plurality of devices.

Example 7 is the method of Example 6, wherein each device may be associated with a screen size different from the screen size of another device.

Example 8 is a system for generating speech samples comprising a memory, a processor, wherein the processor is further adapted to receive a plurality of gesture objects, wherein each gesture object is associated with a respective device, for each gesture object, determine direction information with respect to said respective device, for each pair of adjacent devices determine a displacement parameter based upon a first and second gesture object associated respectively with said pair of adjacent devices, based upon said direction information and said displacement parameter, determine a respective region of said image to display on each device, and, cause each of said plurality of devices to display said respective region of said image.

Example 9 is the system of Example 8, wherein said direction information is one of RIGHT, LEFT, UP or DOWN.

Example 10 is the system of Example 8, wherein said displacement parameter represents a relative offset of said pair of devices in a direction perpendicular to a direction represented by said direction information.

Example 11 is the system of Example 8 wherein said plurality of devices are arranged in a rectilinear and adjacent manner.

Example 12 is the system of Example 8, wherein each of said gesture objects represents a swipe gesture.

Example 13 is the system of Example 8, wherein determining a respective region of said image to display is further determined based upon a respective device screen size associated with each of the plurality of devices.

Example 14 is a computer program product including one or more non-transitory machine-readable mediums encoded with instructions that when executed by one or more processors cause a process to be carried out for displaying an image on a plurality of devices comprising receiving a plurality of gesture objects, wherein each gesture object is associated with a respective device, for each gesture object, determining direction information with respect to said respective device, for each pair of adjacent devices determining a displacement parameter based upon a first and second gesture object associated respectively with said pair of adjacent devices, based upon said direction information and said displacement parameter, determining a respective region of said image to display on each device, and, causing each of said plurality of devices to display said respective region of said image.

Example 15 is the computer program product of Example 14, wherein said direction information is one of RIGHT, LEFT, UP or DOWN.

Example 16 is the computer program product of Example 15, wherein said displacement parameter represents a relative offset of said pair of devices in a direction perpendicular to a direction represented by said direction information.

Example 17 is the computer program product of Example 15, wherein said plurality of devices are arranged in a rectilinear and adjacent manner.

Example 18 is the computer program product of Example 15 wherein each of said gesture objects represents a swipe gesture.

Example 19 is the computer program product of Example 15, wherein determining a respective region of said image to display is further determined based upon a respective device screen size associated with each of the plurality of devices.

Example 20 is the computer program product of Example 19, wherein each device may be associated with a screen size different from the screen size of another device.

What is claimed is:

1. A method for displaying an image on a plurality of devices, the method comprising:

receiving, at a viewport controller system, data characterizing a first display device, the first display device including a first touch sensitive display having a first edge, a center location ($x^1$, $y^1$), a dimension A1 in a first orientation that is characterized by a first coordinate, and a dimension B1 in a second orientation that is characterized by a second coordinate;

receiving, at the viewport controller system, data characterizing a second display device, the second display device including a second touch sensitive display having a second edge, a center location ($x^2$, $y^2$), a dimension A2 in the first orientation, and a dimension B2 in the second orientation, wherein the first and second edges are physically separated from each other;

receiving, at the viewport controller system, data characterizing a first gesture detected by the first display device, wherein the first gesture terminates at an ending point on the first edge of the first touch sensitive display;

receiving, at the viewport controller system, data characterizing a second gesture detected by the second display device, wherein the second gesture initiates at a beginning point on the second edge of the second touch sensitive display;

mapping portions of a global image to each of the first and second touch sensitive displays, wherein the center location ($x^1$, $y^1$) is mapped to a first pixel in the global image;

determining a displacement parameter DP in the second orientation based upon a difference between the beginning and ending points in the second orientation;

mapping the center location ($x^2$, $y^2$) to a second pixel in the global image, wherein a difference between the first and second pixels in the second orientation is DP, and wherein a difference between the first and second pixels in the first orientation is $0.5\times(A1+A2)$;

sending, from the viewport controller system to a first processor associated with the first display device, a first portion of the global image to be displayed on the first touch sensitive display, such that the first pixel of the global image is displayed at the center location ($x^1$, $y^1$) of the first touch sensitive display; and sending, from the viewport controller system to a second processor associated with the second display device, a second portion of the global image to be displayed on the second touch sensitive display, such that the second pixel of the global image is displayed at the center location ($x^2$, $y^2$) of the second touch sensitive display.

2. The method according to claim 1, further comprising causing display of the first portion of the global image on the first touch sensitive display.

3. The method according to claim 1, further comprising causing display of the second portion of the global image on the second touch sensitive display.

4. The method according to claim 1, wherein the first and second display devices are arranged in a rectilinear and adjacent manner.

5. The method according to claim 1, wherein the first and second gestures collectively form a swipe gesture extending from the first display device to the second display device.

6. The method according to claim 1, wherein sending the first portion of the global image to the first processor includes determining a device screen size associated with the first touch sensitive display.

7. The method according to claim 1, wherein the first and second touch sensitive displays each have a different screen size.

8. A viewport controller system for displaying an image on a plurality of devices, the system comprising a memory and a processor that is adapted to:

receive data characterizing a first touch sensitive display having a first edge, a center location ($x^1$, $y^1$), and a dimension A1 in a first orientation that is perpendicular to the first edge;

receive data characterizing a second touch sensitive display having a second edge, a center location ($x^2$, $y^2$), and a dimension A2 in the first orientation, wherein the first and second edges are physically separated from each other;

map portions of a global image to each of the first and second touch sensitive displays, wherein the center location ($x^1$, $y^1$) is mapped to a first pixel in the global image;

map the center location ($x^2$, $y^2$) to a second pixel in the global image, wherein a difference between the first and second pixels in the first orientation is $0.5\times(A1+A2)$;

send, to a first processor associated with the first touch sensitive display, a first portion of the global image to be displayed on the first touch sensitive display, such that the first pixel of the global image is displayed at the center location ($x^1$, $y^1$) of the first touch sensitive display; and send, to a second processor associated with the second touch sensitive display, a second portion of the global image to be displayed on the second touch sensitive display, such that the second pixel of the global image is displayed at the center location ($x^2$, $y^2$) of the second touch sensitive display.

9. The system according to claim 8, wherein the processor is further adapted to:

receive data characterizing a first gesture detected by the first touch sensitive display, wherein the first gesture terminates at an ending point on the first edge of the first touch sensitive display;

receive data characterizing a second gesture detected by the second touch sensitive display, where the second gesture initiates at a beginning point on the second edge of the second touch sensitive display; and determine a displacement parameter DP in a second orientation that is perpendicular to the first orientation, wherein the displacement parameter DP is based on a difference between the beginning and ending points in the second orientation, and wherein a difference between the first and second pixels in the second orientation is DP.

10. The system according to claim 8, wherein the first and second touch sensitive displays are arranged in a rectilinear and adjacent manner.

11. The system according to claim 8, wherein the processor is further adapted to:

receive data characterizing a first gesture detected by the first touch sensitive display, wherein the first gesture terminates at an ending point on the first edge of the first touch sensitive display; and receive data characterizing a second gesture detected by the second touch sensitive display, where the second gesture initiates at a beginning point on the second edge of the second touch sensitive display;

wherein the first and second gestures collectively form a swipe gesture extending from the first touch sensitive display to the second touch sensitive display.

12. The system according to claim 8, wherein sending the first portion of the global image to the first processor includes determining a device screen size associated with the first touch sensitive display.

13. The method according to claim 8, wherein the first and second touch sensitive displays each have a different screen size.

14. A computer program product including one or more non-transitory machine-readable mediums encoded with instructions that when executed by one or more processors cause a process to be carried out, the process comprising:
- receiving data characterizing a first touch sensitive display having a first edge, a center location $(x^1, y^1)$, and a dimension A1 in a first orientation that is perpendicular to the first edge;
- receiving data characterizing a second touch sensitive display having a second edge, a center location $(x^2, y^2)$, and a dimension A2 in the first orientation, wherein the first and second edges are physically separated from each other;
- mapping portions of a global image to each of the first and second touch sensitive displays, wherein the center location $(x^1, y^1)$ is mapped to a first pixel in the global image;
- mapping the center location $(x^2, y^2)$ to a second pixel in the global image, wherein a difference between the first and second pixels in the first orientation is 0.5×(A1+A2);
- sending, to a first processor associated with the first touch sensitive display, a first portion of the global image to be displayed on the first touch sensitive display, such that the first pixel of the global image is displayed at the center location $(x^1, y^1)$ of the first touch sensitive display; and
- sending, to a second processor associated with the second touch sensitive display, a second portion of the global image to be displayed on the second touch sensitive display, such that the second pixel of the global image is displayed at the center location $(x^2, y^2)$ of the second touch sensitive display.

15. The computer program product according to claim 14, wherein the process further comprises causing display of the first portion of the global image on the first touch sensitive display.

16. The computer program product according to claim 14, wherein the process further comprises:
- receiving data characterizing a first gesture detected by the first touch sensitive display, wherein the first gesture terminates at an ending point on the first edge of the first touch sensitive display;
- receiving data characterizing a second gesture detected by the second touch sensitive display, wherein the second gesture initiates at a beginning point on the second edge of the second touch sensitive display; and
- determining a displacement parameter DP in a second orientation that is perpendicular to the first orientation, wherein the displacement parameter is based on a difference between the beginning and ending points in the second orientation, and wherein a difference between the first and second pixels in the second orientation is DP.

17. The computer program product according to claim 14, wherein the first and second touch sensitive displays are arranged in a rectilinear and adjacent manner.

18. The computer program product according to claim 14, wherein the process further comprises:
- receiving data characterizing a first gesture detected by the first touch sensitive display, wherein the first gesture terminates at an ending point on the first edge of the first touch sensitive display; and
- receiving data characterizing a second gesture detected by the second touch sensitive display, where the second gesture initiates at a beginning point on the second edge of the second touch sensitive display;
- wherein the first and second gestures collectively form a swipe gesture extending from the first touch sensitive display to the second touch sensitive display.

19. The computer program product according to claim 14, wherein sending the first portion of the global image to the first processor includes determining a device screen size associated with the first touch sensitive display.

20. The computer program product according to claim 14, wherein the first and second touch sensitive displays each have a different screen size.

\* \* \* \* \*